Oct. 6, 1931.  W. F. DEHUFF  1,826,242
DOUGH MIXER
Filed July 27, 1929
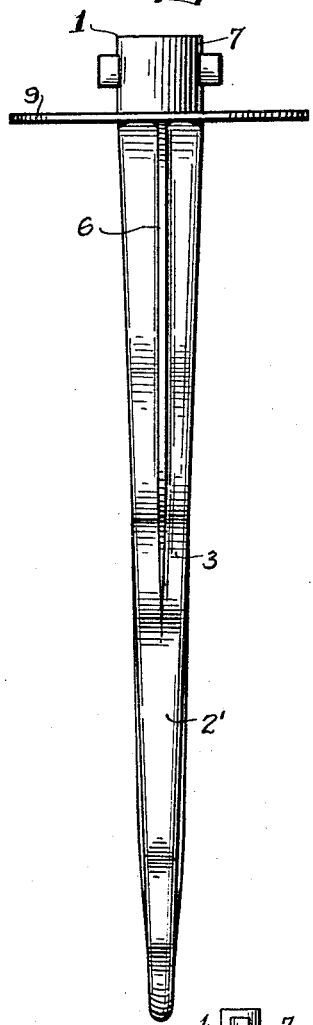
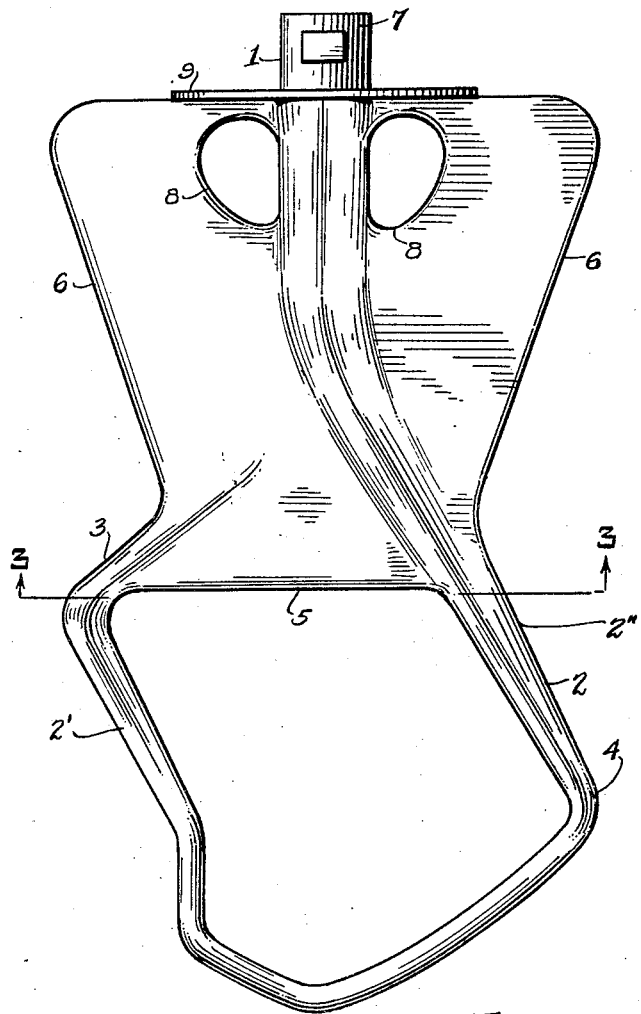
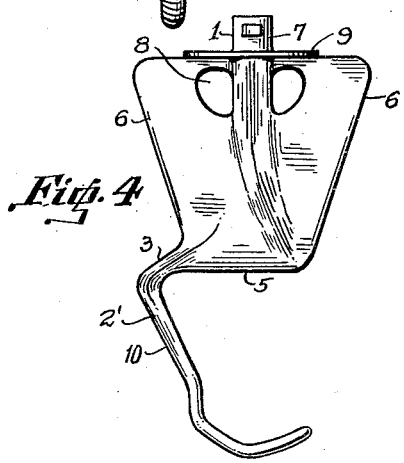
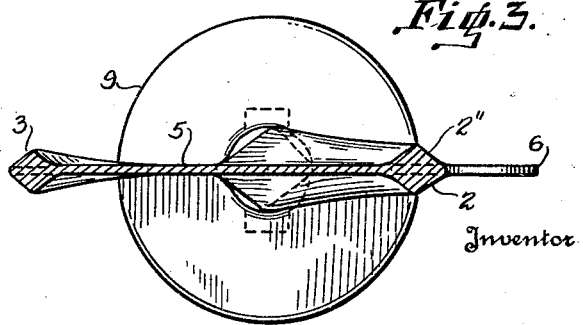
Inventor
W. F. Dehuff
By Mason Fenwick Lawrence
Attorneys Patented Oct. 6, 1931

1,826,242

UNITED STATES PATENT OFFICE

WALTER F. DEHUFF, OF GLEN ROCK, PENNSYLVANIA

DOUGH MIXER

Application filed July 27, 1929. Serial No. 381,522.

This invention relates to a dough agitator or mixing paddle to be used in connection with the usual mixing machine, and is designed particularly to improve the mixing, kneading and stretching action which is necessary in beaters of this type.

The principal object is to provide a beater which is evenly balanced to relieve the machine from any unnecessary strain present in the mixing operation, to throughly knead the dough, stretch the same, and complete the cycle of operation which starts with the accumulation of the dough around the bottom of the mixer and the working of the same up through the center of the agitator to the top until it falls down of its own weight on the outside.

The usual beater consists of an open hook with a flange at the top, which results in a fairly good mixing action, but a very poor transfer of the dough from the top to the bottom, and a very poor stretching action which is essential to the proper kneading. The dough agitator of the hook type particularly when mixing at high speed, creates an unbalanced condition in the machine, and causes excessive vibration. Not only is it necessary to properly mix the dough, but gluten must be developed. The development of the gluten requires that the dough must be properly kneaded and stretched. In the open hook type, the dough will collect and wind up the leg of the beater, finally collecting at the top of the hook, at which point practically no mixing or kneading will be done. Further, there will be no cycle of operation. Further it is necessary that the dough be exposed to the air to prevent the rise of temperature which will result in very inferior bread.

Another object is to cause a complete cycle of movement, during which the dough will be mixed, kneaded and stretched. During this movement, the dough will feed up through the center of the agitator and drop down on the outside, due to the stretching movement and its own weight. During this movement, the dough is exposed to the air which keeps the temperature down which is essential to proper bread making.

Still another object is to present a mixer that can be used at either high or low speed, and at the same time, will keep the temperature at a low point.

Still another object is to present a mixer that will properly develop the gluten in the dough under the most satisfactory conditions.

Other objects will be disclosed in the specification and drawings forming a part of this application.

In the drawings:

Figure 1 is a front elevation of the mixer;

Figure 2 is a side elevation;

Figure 3 is a section taken on line 3—3 of Figure 1; and

Figure 4 is a modification similar to Figure 1 showing an open hook instead of a loop.

Referring to the drawings:

Numeral 1 designates a dough agitator to be used in connection with the usual present day mixing machine, having a loop 2, the opposite sides of the loop forming legs 2' and 2''. The loop 2 has a shoulder 3 on one side and a projection 4 diagonally opposite. At the top of the loop 2 is a shearer blade 5 formed integral with the loop 2 and the dough agitator 1. Extending up from the loop 2 are stretching blades 6 on both sides of a shaft 7. Within the stretching blades 6 and adjacent shaft 7 are openings 8. Forming a part of the shaft 7 and directly above the stretching blades 6 is formed a flange 9.

The entire dough agitator or mixing paddle can be cast as an integral part. The modification shown in Figure 4 is exactly the same as the preferred form shown in Figures 1, 2, and 3, with the exception that an open hook 10 is used instead of the loop 2.

As actually used in the preferred form, the ingredients will be placed in the mixing vat and the dough agitator 1 will start to revolve. As the dough starts to form it will work up each leg 2′ and 2″ of the loop 2 encircling the legs 2′ and 2″ until the shearer blade 5 is encountered.

It is to be noted that leg 2′ has a shoulder 3 which extends beyond the projection 4 on leg 2″, with the result that when the dough agitator revolves, the leg 2′ will circumscribe an arc greater than the arc circumscribed by leg 2″, with the result that a mass of material will be reached by leg 2′ that will not be reached by leg 2″.

The dough will then be forced from the loop 2 and continue up around the stretching blades 6, the dough being stretched until it falls down of its own weight. While the dough is forming around the loop 2, it is being thoroughly mixed, and a certain amount of kneading action is taking place, and at the same time, the gluten is being developed.

Upon reaching the shearer blade 5 and upon being stripped from the loop 2, the stretching action will commence, permitting the air to get to the dough, keeping the temperature down, and at the same time, giving the gluten full opportunity to develop. Due to the continuous increase in the outward flange of the stretching blades 6, the dough will be increasingly stretched until it reaches a point near the top, where it will fall of its own weight.

Further, by using a loop instead of the open hook, the agitator will always be in a balanced condition, thus saving wear and tear on the machine, and doing away with a great deal of the vibration that is now present in agitators of this nature.

It is obvious that in my construction I have overcome all the objections that have been previously present in dough mixers to be used with mixing machines.

Although the modified form of mixer shown in Figure 4 is not as desirable as the preferred form, satisfactory results can be obtained by using the type shown therein, using an open hook instead of a loop.

The use of the openings 8 in the stretching blades 6 serve to make the same lighter and permit a better circulation of air.

Having described my invention, it is understood that I do not limit myself to the specific form shown herein, but claim all the types of construction which may come within the breadth of my invention.

What I claim is:

1. A dough mixer comprising a shaft, a hollow loop in the form of an agitator secured to said shaft, a shearer blade secured at the top of said loop.

2. A dough mixer comprising a shaft, a hollow loop in the form of an agitator secured to said shaft, a dough stretcher secured to said shaft adjacent the top of said loop.

3. A dough mixer comprising a shaft, a hollow loop in the form of an agitator secured to said shaft, a shearer blade secured at the top of said loop, a dough stretcher supported by said shaft and extending from the top of said loop along both sides of said shaft.

4. A dough mixer comprising a shaft, a hollow loop in the form of an agitator secured to said shaft, flat stretching blades secured to said shaft adjacent said loop and extending outwardly and upwardly along the sides of said shaft.

5. A dough mixer comprising a shaft, a hollow loop in the form of an agitator secured to said shaft, a shearer blade secured to the top of said loop on the inside, stretching blades secured to said shaft adjacent said loop and extending outwardly and upwardly along both sides of said shaft.

6. A dough mixer comprising a shaft, a hollow loop in the form of an agitator secured to said shaft, a shearer blade secured to the top of said loop on the inside, stretching blades secured to said shaft adjacent said loop and extending outwardly and upwardly along both sides of said shaft, and a flange at the top of said shearer blade.

7. A dough mixer comprising a shaft, a mixing member secured to said shaft, a shearer blade secured to said shaft at the top of said mixing member.

8. A dough mixer comprising a shaft, a mixing member secured to said shaft, a shearer blade secured at the top of said mixing member, a dough stretcher supported by said shaft and extending from the top of said mixing member along both sides of said shaft.

9. A dough mixer comprising a shaft, a mixing member secured to said shaft, a shearer blade secured to the top of said mixing member on the inside, stretching blades secured to said shaft adjacent said mixing member and extending outwardly and upwardly along both sides of said shaft.

10. A dough mixer comprising a shaft, a plurality of mixing members secured to said shaft, a shearer blade secured to the top of said mixing members, stretching blades supported by said shaft and extending from the top of said mixing members along the sides of said shaft.

11. A dough mixer having an upper substantially flat part provided with a downwardly directed cutting edge and an agitator member depending therefrom.

12. In a rotatable dough mixer, a dough stretcher having upwardly and outwardly inclined side edges and a bottom cutting edge and an agitator positioned below said stretcher adapted to feed the dough upwardly onto the stretcher.

13. A dough mixer comprising a shaft, a mixing member supported by said shaft, means in the form of stretching blades positioned above the mixing member for stretching the dough delivered to it by the mixing member, said means extending outwardly and upwardly from said mixing member.

14. In a rotatable dough mixer, a dough stretcher having upwardly and outwardly extending side edges and an agitator positioned below the stretcher adapted to feed the dough onto said stretcher.

In testimony whereof I affix my signature.

WALTER F. DEHUFF.